United States Patent
Chauchard et al.

(10) Patent No.: US 12,510,483 B2
(45) Date of Patent: Dec. 30, 2025

(54) IMMERSION TIP AND ASSOCIATED RAMAN PROBE

(71) Applicant: INDATECH, Clapiers (FR)

(72) Inventors: Fabien Chauchard, Clapiers (FR); Davinia Brouckaert, Clapiers (FR)

(73) Assignee: INDATECH, Clapiers (FR)

( * ) Notice: Subject to any disclaimer, the term of this patent is extended or adjusted under 35 U.S.C. 154(b) by 67 days.

(21) Appl. No.: 18/345,404

(22) Filed: Jun. 30, 2023

(65) Prior Publication Data
US 2024/0003816 A1    Jan. 4, 2024

(30) Foreign Application Priority Data
Jun. 30, 2022   (FR) ...................... 2206592

(51) Int. Cl.
| | | |
|---|---|---|
| *G01N 21/65* | (2006.01) | |
| *G01J 3/02* | (2006.01) | |
| *G01J 3/44* | (2006.01) | |
| *G01N 21/85* | (2006.01) | |
| *G02B 27/30* | (2006.01) | |

(52) U.S. Cl.
CPC .............. *G01N 21/65* (2013.01); *G01J 3/024* (2013.01); *G01J 3/44* (2013.01); *G01N 21/8507* (2013.01); *G02B 27/30* (2013.01)

(58) Field of Classification Search
CPC ........................... G01N 21/65; G01N 21/8507
See application file for complete search history.

(56) References Cited

U.S. PATENT DOCUMENTS 5,112,127 A * 5/1992 Carrabba .................. G01J 3/44
356/301
2003/0191398 A1 * 10/2003 Motz .................... A61B 5/0091
600/478
2009/0153852 A1 * 6/2009 Rensen ...................... G01J 3/02
356/300
2010/0302537 A1 * 12/2010 Chauchard ............. G01N 21/31
356/317
2019/0383662 A1 * 12/2019 Owen ........................ G01J 3/44
2020/0116639 A1    4/2020 Owen

FOREIGN PATENT DOCUMENTS

| EP | 2982967 A1 | 2/2016 |
| FR | 2583164 A1 | 12/1986 |
| WO | 2014124531 A1 | 8/2014 |

OTHER PUBLICATIONS

French Search Report from corresponding FR Application No. 2206592, Jan. 26, 2023.

* cited by examiner

*Primary Examiner* — Uzma Alam
*Assistant Examiner* — Mohamed Doumbia
(74) *Attorney, Agent, or Firm* — Workman Nydegger

(57) ABSTRACT

Immersion tip of a probe for Raman spectroscopy comprising a cylindrical body equipped with a collimating optic and/or a window and designed to be immersed in a liquid to be analysed, the cylindrical body consisting of two parts separated by a slit intended to allow the liquid to be analysed to pass through it, the first part being hollow and traversed from a first end by light emission and reception signals, the other end opposite the first being closed by the collimating optic and/or the window, the second part being configured to prevent any reception of stray light other than that passing through the slit and comprising a part made of a light-absorbent material arranged facing the window.

10 Claims, 2 Drawing Sheets

IMMERSION TIP AND ASSOCIATED RAMAN PROBE

TECHNICAL FIELD

The present invention relates to the field of measurement by Raman spectrometer and it more particularly concerns an immersion tip of a probe for Raman spectroscopy.

BACKGROUND

Raman spectroscopy is increasingly used in some advanced fields, particularly in biotechnology. It can provide real-time information on the concentration of several nutrients such as glucose, lactate and glutamine. It is also possible to obtain information on the total concentration of antibodies produced by the cells or on the glycosylation of the antibodies.

However, cell culture processes are long (several weeks) and complex to control due to the use of living cells with very variable behaviour and needing constant nutrient requirements (the consumption of the nutritional medium depends on the type of cells) to ensure good growth and sufficient cell production. In addition, these processes are difficult to repeat at an industrial level due to a batch effect and scale change (going from an experimental reactor of 0.5 L to several hundred litres in the production phase).

Raman spectroscopy uses the inelastic scattering principle that is generated when a sample is illuminated by intense monochromatic light. Current devices use a laser source with a fixed wavelength. This source is focused on a spot of small diameter (typically from 100 µm to 200 µm) in order to have sufficient density to generate the Raman effect. This is very weak compared to the other interaction phenomena existing between light and matter, which are, in order of importance: elastic scattering (Rayleigh, Mie), light absorption, fluorescence and Raman effect.

Since Raman effect is the weakest of these phenomena of light/matter interaction, the measuring device (laser spectrometer), to capture the slightest photon, must eliminate these other unwanted phenomena by a series of filters and by an appropriate choice of wavelength. For example, since 532 nm lasers often generate fluorescence in biological media, Raman spectrometers rely instead on the use of lasers with longer wavelengths, especially 785 nm or 830 nm.

Moreover, when it is desired to carry out a liquid measurement in situ in such biological media, due to the high sensitivity to moisture and heat of the optical elements, it is impossible to press the measuring device directly against or into this liquid and it is therefore necessary to transport this measurement by means of optical fibres.

FIG. 3 shows a current example of a biological reactor 10 containing a liquid 12 whose properties it is desired to analyse. This reactor is equipped with a paddle stirrer 14 and can receive a Raman probe 16 and possibly another optical probe (for example an optical turbidimeter 18). The Raman probe comprises an immersion tip 20 immersed in the liquid to be analysed 12 and it is connected by a first fibre 22 to a laser source 24 delivering a laser emission signal and by a second fibre 26 to a spectrometer 28 receiving a reception light signal to be analysed (the measurement signal). The immersion tip 20 is generally made up of a cylindrical body 30 equipped with a collimating optic (lens or micro-ball 32) and provided at its free end with a window 34 (the lens or ball can also act as a window) held fixedly to the body 30 by seal, glue, brazing, welding or any other means making it possible to constitute an assembly which is perfectly sealed with respect to the liquid to be analysed 12.

The internal structure of the probe is detailed in FIGS. 4A and 4B which illustrate two standard variants thereof. In FIG. 4A, the transmit fibre 22 and the receive fibre 26 are independent and therefore each comprise at the end of the fibre a collimator 40, 42 followed by a filter, filter 44 to clean the light signal leaving the transmit fibre 22 connected to the laser 24 which emits the radiation, or filter 46 to pass only the measurement signal resulting from the Raman effect from the analysed medium (the sample). A prism 48 and a dichroic plate 50 complete this structure to separate the emitted light signal from the received measurement signal both circulating in the immersion tip 20. Sometimes the transmit fibre 22 and the receive fibre 26 can be combined in a bundle of fibres and collimated with a single optical element 52. In this case, the filters 44, 46 are most often placed directly on the fibres, or else mounted at the fibre outlet as illustrated in FIG. 4B.

Despite numerous optimisation studies, the implementation of Raman spectroscopy remains complex. Indeed, most biological reactors are transparent (glass or disposable plastic) so that operators can see how the culture is proceeding. This results in a high sensitivity to ambient light which, by reflection on the bottom of the reactor, impacts the immersion tip 20 (reference 60 in FIG. 3) or coming from other sensors 14, 18 used in the reactor and which can then interfere with the measurement (for example, due to reflections on stirrer blades or other metal surfaces). In order to eliminate this phenomenon, industrial operators are obliged to cover their reactor with a black sheet or aluminum foil, a practice acceptable in the experimental or development phase but unthinkable in the production phase. Similarly, the measurement suffers from a significant lack of sensitivity often due to very low nutrient concentrations in the medium, resulting from a very high dilution, and to the turbidity of this medium which increases with cell growth and causes loss of Raman intensity (less intense and more diffuse spot).

SUMMARY

The main objective of the present invention is therefore to overcome the aforementioned disadvantages by limiting the parasitic effect of ambient light or other optical sensors present in the reactor and by improving the level of the Raman signal collected. Another objective is to increase cell densities to improve the profitability of the process.

These aims are achieved by an immersion tip for Raman spectroscopy comprising a cylindrical body equipped with a collimating optic and/or a window and designed to be immersed in a liquid to be analysed, characterised in that the cylindrical body consists of two parts separated by a slit intended to allow the liquid to be analysed to pass through it, the first part being hollow and traversed from a first end by light emission and reception signals, the other end opposite the first being closed by the collimating optic and/or the window, the second part being configured to prevent any reception of stray light other than that passing through the slit and comprising a part made of a light-absorbent material arranged facing the window.

Thus, with this slit and the integration of an absorbent material, the effects of stray light are limited and the performance of the Raman probe is greatly improved.

According to an advantageous embodiment, the light-absorbent material constitutes the central part of a reflective material of concave spherical shape making it possible to redirect the collected Raman signal towards a single focusing point corresponding to the focusing point of the collimating optic.

Preferably, the slit has a width L of between 0.5 and 10 mm and typically around 3 mm and a thickness E substantially equal to a width of the window.

Advantageously, the light-absorbent material is a black polymer or a black treated stainless steel absorbing at least 90% of the light in a range of ±300 nm around the wavelength of the emission light signal.

Preferably, the cylindrical body is made of metal, in the case of reusable tips, or of plastic, in the case of disposable tips.

Advantageously, the cylindrical body is welded to a liquid sampling bag in the case of disposable tips.

Depending on the embodiments envisaged, the first hollow portion may be configured to receive at the first end a single transmit/receive optical fibre, or a bundle of circular optical fibres with the transmit fibre disposed at the centre and the receive fibres around this centre fibre, or a bundle of circular optical fibres with transmit fibres disposed at the periphery of a receive fibre.

BRIEF DESCRIPTION OF THE DRAWINGS

Other characteristics and advantages of the present invention will emerge from the description given below, with reference to the attached drawings which illustrate an example of embodiment thereof which is not at all limiting and in which.

DETAILED DESCRIPTION OF THE EMBODIMENTS

The principle of the invention is based on an immersion tip whose particular innovative structure associated with a traditional measuring system makes it possible to respond to many industrial problems for the control of chemical formulation processes.

Typically, the compounds will emit spectral bands or lines at specific wavelengths in the near infrared (NIR) to identify the compound and quantify it. This quantification is conventionally done either directly by a linear regression performed on these bands, or by a multivariate modeling approach (chemometrics and machine learning). In the latter case, various algorithms, known to the person skilled in the art and therefore unnecessary to detail, can be used, such as partial least square (PLS), principal component analysis (PCA) or support vector machine (SVM) for non-linear methods.

Figure 1:
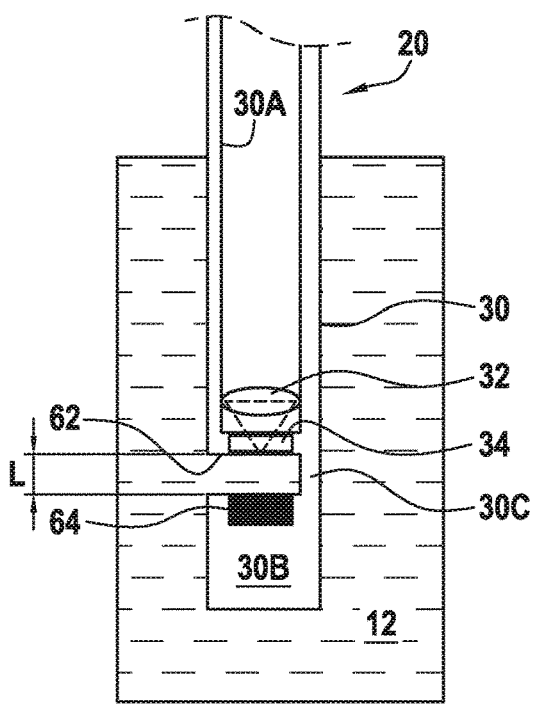
FIG. 1 illustrates a first example of embodiment of an immersion tip according to the invention.
Figure 1A:
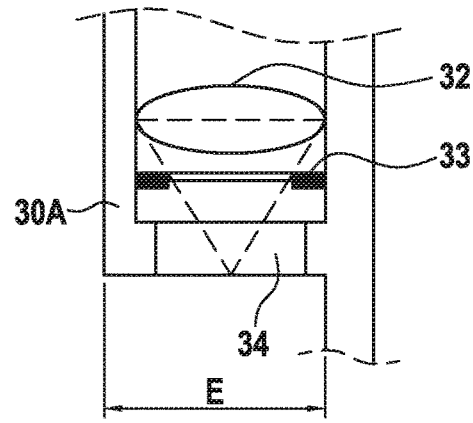
FIG. 1A illustrates an alternative embodiment of the immersion tip of FIG. 1.
Figure 3:
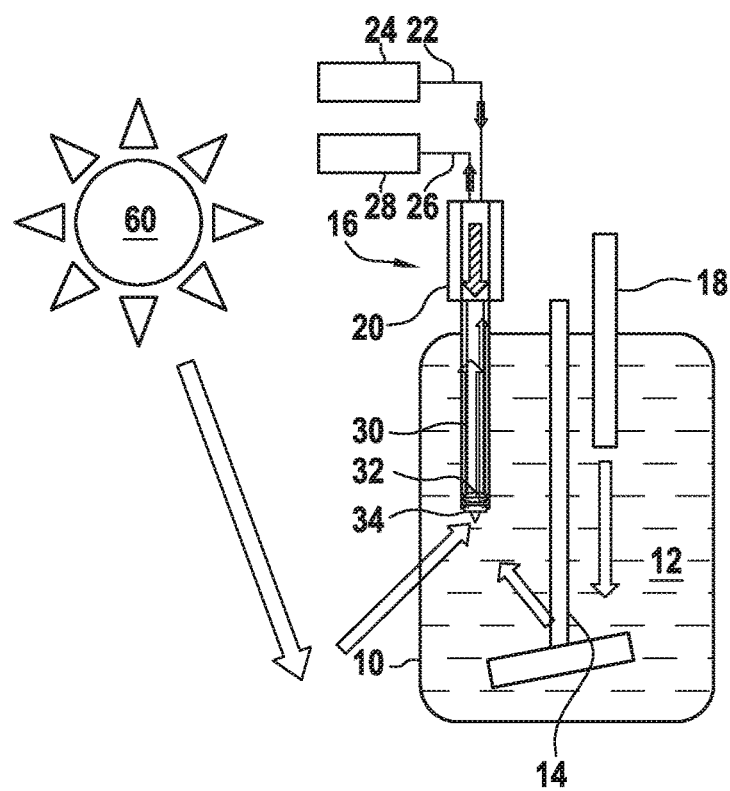
FIG. 3 shows a reactor equipped for Raman spectroscopy.
Figures 4A, 4B:
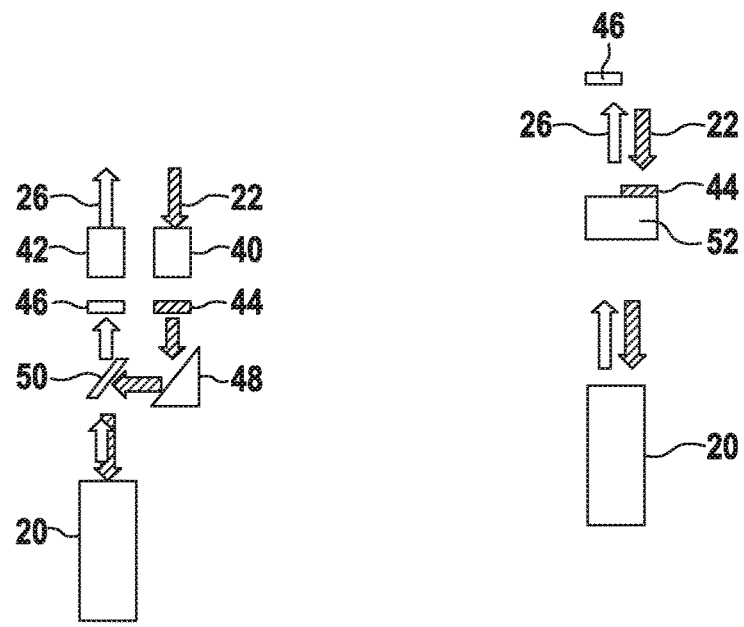
FIGS. 4A and 4B show two examples of the internal structure of a Raman probe adapted to the immersion tips of FIGS. 1 and 2.

In accordance with the invention, and as shown in the example of embodiment of FIG. 1, to limit the effect of stray light, the immersion tip which advantageously has a cylindrical body 30 comprises a slit 62 slit 64 of width L separating the body into two parts 30A, 30B and allowing the liquid medium 12 to pass through it for the measurement (of course, the slit has a thickness E less than the diameter of the body 30 defining, with the remaining body thickness, a solid part 30C connecting the parts 30A and 30B). The first part 30A of which a first end (not shown in this figure) is intended to receive the transmit/receive fibre or the transmit and receive fibres is hollow in order to pass the collimated laser signal from the transmit fibre(s) and the Raman measurement signal emitted in return by the sample, the other end opposite the first being closed by the lens 32 and/or the window 34. The second part 30B is advantageously solid (but a simple hood or cap is also possible) and therefore prevents any reception of light that can enter from below in the devices of the state of the art (see FIG. 3). This ambient or artificial light can only penetrate the immersion tip on the side through the slit 64, over a maximum width defined by the width L of the slit (advantageously between 0.5 and 10 mm, more particularly between 1 and 5 mm and typically around 3 mm). This second part further comprises a part 64 disposed facing the window 34 and formed of a light-absorbent material (for example a black polymer or a black treated stainless steel having an absorption capacity for visible and near infrared light of at least 90%). More particularly, radiation should be absorbed within a range of plus or minus 300 nm around the wavelength of the laser emission signal. Thus, for a laser emitting at 785 nm, the material will be chosen so as to absorb the light over a range of 485 to 1085 nm corresponding to the zone where the Stokes and anti-Stokes Raman emission lines will appear. This absorbent material thus eliminates any external light that might have passed through the slit. Moreover, it limits the Rayleigh laser reflections and diffusions which appear on turbid matrices, in particular. This configuration is particularly advantageous when the laser emission is carried out by a single fibre which also ensures the reception of the Raman measurement signal.

To eliminate stray light inside the immersion tip, a light-absorbent material 33 can be added between the lens 32 and the window 34 as shown in FIG. 1B. A black ceramic, a black surface treated metal or a black PEEK plastic with a visible and near infrared light absorption capacity greater than 90% may be completely suitable as an absorbent material.

The immersion tip can be made of metal, in the case of reusable tips, or plastic in the case of single-use systems (use of the tip for a single batch, the immersion tip being delivered welded to the liquid sampling bag).

Figure 2:
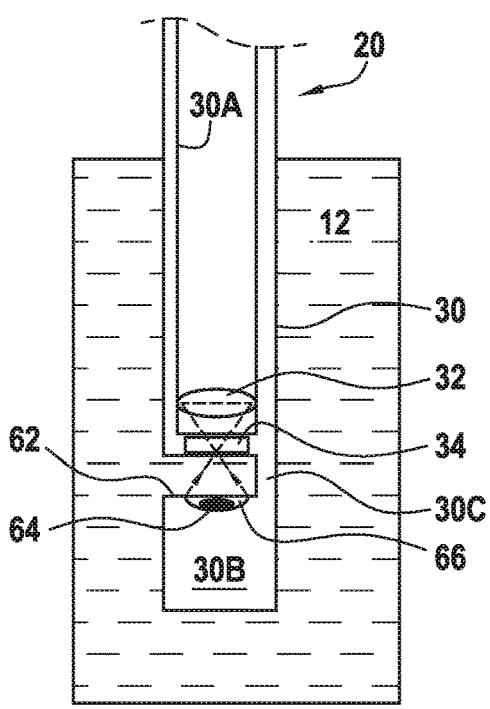
FIG. 2 illustrates a second example of embodiment of an immersion tip according to the invention.

FIG. 2 shows another example of embodiment which allows an additional amplification of the Raman signal collected by combining the absorbent material 64 with a reflective material 66 and by redirecting the Raman signal towards a single focusing point corresponding to the focusing point of the collimating optic. This redirection to a single focus point prevents only the conventional Rayleigh scattering from being amplified. The reflective material is formed in a part of concave spherical shape whose external radius is equal to that of the window 34 which faces it and therefore with a radius substantially equal to the thickness E of the slit, in order to reflect a focusing point in front of the window (the measurement window). At its centre, this spherical part comprises the absorbent material 64.

Figure 2A:
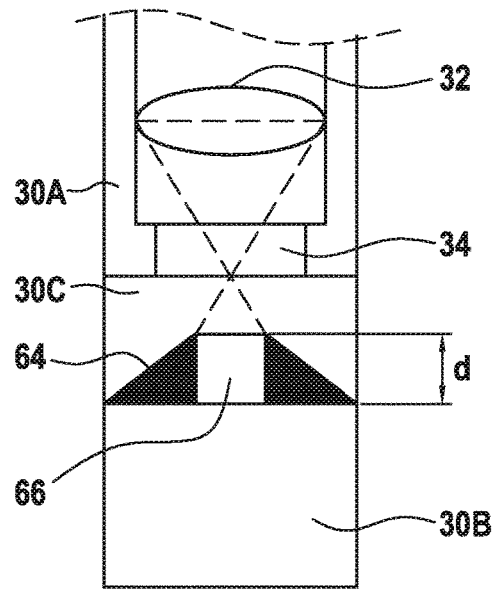
FIG. 2A illustrates an alternative embodiment of the immersion tip of FIG. 2.

In another embodiment, not shown, depending on the type of optical fibres used, the absorbent material 64 and reflective material 66 may be inverted. The reflective material is disposed at the centre and the absorbent material is disposed at the periphery thereof. More precisely, in the case where the laser illumination is performed by a bundle of circular optical fibres with the transmit fibre disposed at the centre and the receive fibres around this central fibre, the absorbent material should be placed at the centre and the reflective material at the periphery. In contrast, in the case where this illumination is done by a multimode single-core transmit/receive fibre, the reflective material will be placed in the centre and the absorbent material will be placed on the edges as illustrated in FIG. 2A. In this variant of embodiment, the reflective material (a semi-spherical or flat mirror made of white metal or white ceramic reflecting visible or near infrared light by at least 95%) is positioned at a distance d as close as possible to the window of the immersion tip (the probe window), i.e., at approximately half the width L of the slit (or between 500 μm and 2.5 mm for a slit between 1 and 5 mm, respectively). Advantageously, the absorbent material has a conical shape making it possible to absorb more light while allowing fluid circulation of the liquid.

The invention claimed is:

1. An immersion tip of a probe for Raman spectroscopy comprising:
    a cylindrical body equipped with a collimating optic and/or a window and designed to be immersed in a liquid to be analysed,
    wherein the cylindrical body consists of two parts separated by a single slit intended to allow the liquid to be analysed to pass through the single slit, a first part of the two parts being hollow and traversed from a first end by light emission and reception signals, a second end opposite the first end being closed by the collimating optic and/or the window, a second part of the two parts being configured to prevent any reception of stray light other than that passing through the single slit and comprising a part made of a light-absorbent material arranged facing the window, wherein light is limited to penetrating the immersion tip through the single slit.

2. The immersion tip according to claim 1, wherein the light-absorbent material constitutes a central part of a reflective material of concave spherical shape arranged to redirect a collected Raman signal towards a single focusing point corresponding to the focusing point of the collimating optic.

3. The immersion tip according to claim 1, wherein the single slit has a width L of between 0.5 and 10 mm and a thickness E substantially equal to a width of the window.

4. The immersion tip according to claim 1, wherein the light-absorbent material is a black polymer or a black treated stainless steel absorbing at least 90% of the light in a range of +300 nm around the wavelength of the emission light signal.

5. The immersion tip according to claim 1, wherein the cylindrical body is made of metal or of plastic.

6. The immersion tip according to claim 5, wherein the cylindrical body is welded to a liquid sampling bag.

7. The immersion tip according to claim 1, wherein the hollow portion is configured to receive at the first end a single transmit/receive optical fibre.

8. The immersion tip according to claim 2, wherein the hollow portion is configured to receive at the first end a bundle of circular optical fibres with a transmit fiber centrally disposed and the receive fibres around this central fiber.

9. The immersion tip according to claim 2, wherein the first hollow portion is configured to receive at the first end a bundle of circular optical fibres with transmit fibres disposed at the periphery of a receive fibre.

10. A Raman probe comprising an immersion tip according to claim 1.

* * * * *